United States Patent [19]
Millard

[11] Patent Number: 4,962,611
[45] Date of Patent: * Oct. 16, 1990

[54] PORTABLE ELECTRONIC INSECT CONTROLLER

[76] Inventor: Lance L. Millard, 2820 E. 36th Ct., Des Moines, Iowa 50317

[*] Notice: The portion of the term of this patent subsequent to Aug. 5, 2003 has been disclaimed.

[21] Appl. No.: 274,974
[22] Filed: Nov. 22, 1988

Related U.S. Application Data

[63] Continuation-in-part of Ser. No. 498,925, May 26, 1983, Pat. No. 4,603,505.

[51] Int. Cl.$^5$ .............................................. A01M 1/22
[52] U.S. Cl. ......................................... 43/112; 43/113; 362/179; 431/253
[58] Field of Search .................. 43/112, 113; 362/179; 431/253

[56] References Cited
U.S. PATENT DOCUMENTS

| | | | |
|---|---|---|---|
| 1,960,084 | 6/1932 | Folmer et al. | 43/112 |
| 1,962,439 | 10/1931 | Fulmer et al. | 43/112 |
| 2,881,554 | 10/1958 | Laine | 43/112 |
| 3,758,980 | 10/1973 | Bialobrzeski | 43/112 |
| 4,182,069 | 1/1980 | De Yoreo | 43/112 |
| 4,603,505 | 9/1986 | Millard | 43/112 |
| 4,785,573 | 11/1988 | Millard | 43/112 |

Primary Examiner—Richard K. Seidel
Assistant Examiner—James Miner

[57] ABSTRACT

A portable insect electrocutor trap is provided wherein an electrified alternately polarized grid assembly detachably connects to a liquid fuel lantern. The grid assembly includes a top and bottom ring spaced apart and parallel to each other. Bars connected to the rings extend downward from the top ring and upward from the bottom ring in a spaced arrangement and are insulated from each other. A grid bracket operatively engages the rings and bars in a fixed position and attaches to the lantern's frame bottom. The grid bracket includes braces which function to support a globe surrounding the light emitting region of the lantern and connects the grid to the lantern in a spaced relationship. A base is provided which attaches to the lantern and into which is housed a power supply for electrification of the grid. The power supply steps up the voltage from a direct current source to a high enough voltage to stun or kill an insect when the insect passes near the bars. An interconnect strap connects the power supply to the grid and its length is only sufficient to extend between the power supply and grid, thereby requiring that the grid be disconnected from the power supply prior to removing the grid assembly from the lantern, thus preventing the accidental electrocution of people attempting to remove an electrically charged grid to service the lantern in the region that the grid assembly surrounds.

23 Claims, 5 Drawing Sheets

PORTABLE ELECTRONIC INSECT CONTROLLER

BACKGROUND OF THE INVENTION

In my prior patents, U.S. Pat. No. 4,785,573, application No. 893,003, filed on Aug. 1, 1986, and U.S. Pat. No. 4,603,505, application No. 498,925, filed on May 26, 1983, I disclosed an insect electrocutor system detachably connected to a liquid fuel lantern. One component of the system was a safety electrical interconnect which functions to prevent refueling of the lantern without first disconnecting the power supply from the grid. Another component was the grid bracket which held the grid in a fixed position to the lantern. The grid bracket includes posts that extend downward to engage a collar which is pulled together by buckle connectors thereby securing the grid assembly to the lantern.

It is believed that additional improvements associated with this basic system will improve its ease of use by making it safer and more economically produced.

SUMMARY OF THE INVENTION

A portable insect electrocutor including an electrified alternately polarized grid surrounding the light emitting region of a liquid fuel lantern. Top and bottom rings, spaced apart including bars connecting to the top ring that are insulated from the bottom ring and bars connecting to the bottom ring that are insulated from the top ring comprise the grid. A grid bracket engages the rings and bars in a fixed position and attaches to the lantern's frame bottom, thereby utilizing the compression created between the lantern's frame bottom and chimney to secure the grid to the lantern, thus eliminating the grid bracket posts, collar, buckle connectors, and the additional costs associated thereof. The grid bracket includes members that support a globe surrounding the light emitting region of the lantern and simultaneously connects the grid to the lantern in a spaced and insulated relation. The bars insert through orifices provided in the grid bracket and connect to their proper ring. A base is provided which attaches to the lantern and into which is housed a power supply for electrification of the grid. A conventional converter steps up the voltage from a direct current power source to a high enough voltage to stun or kill an insect when the insect passes near or comes into contact with the electrically charged grid. An interconnect device transfers the electricity from the power supply to the grid and is of the length which is only sufficient to extend between the power supply and the grid, thereby requiring that the grid be disconnected from the power supply prior to removing the grid assembly from the lantern.

DESCRIPTION OF THE PREFERRED EMBODIMENT

Figure 1:
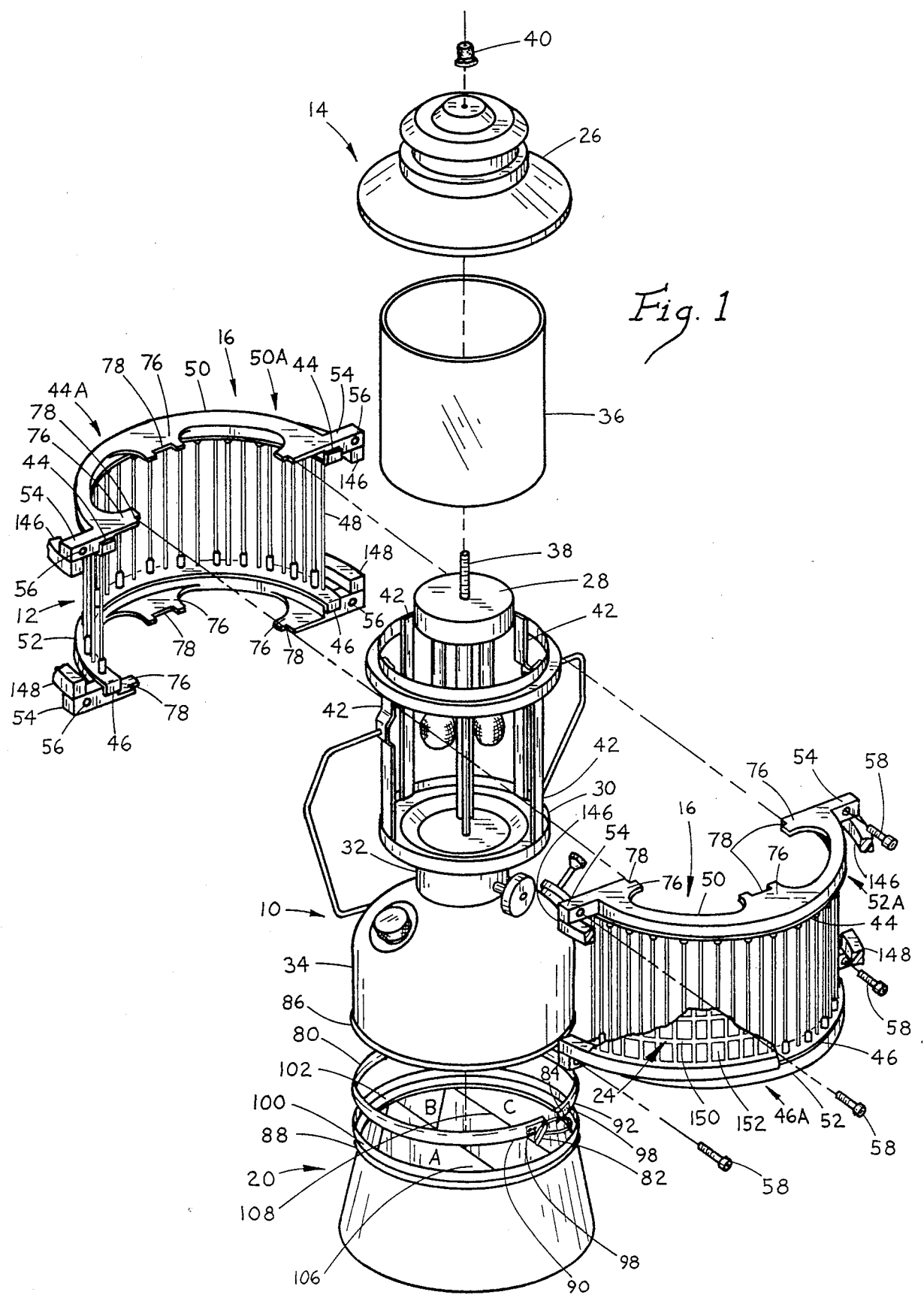
FIG. 1 is an exploded perspective view of the portable insect electrocutor.
Figure 2:
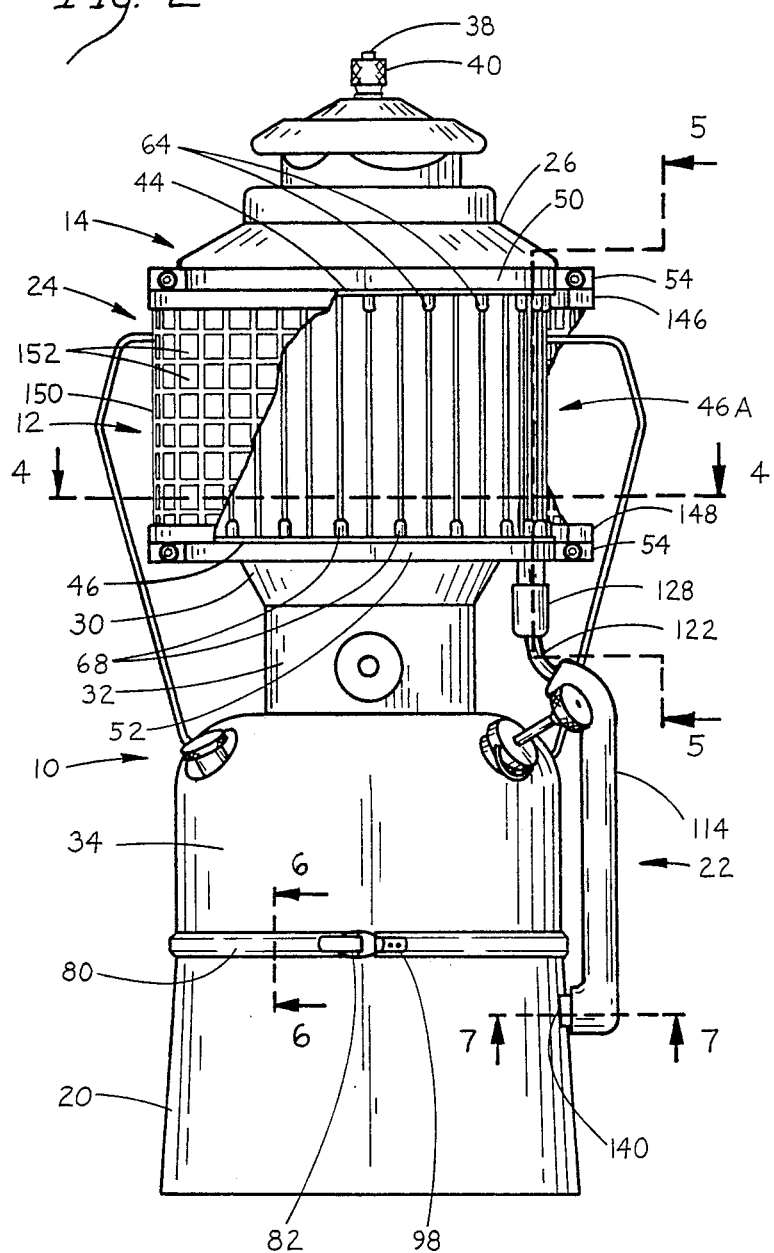
FIG. 2 is a cross-sectional front view of the present invention.

Referring now to the drawings wherein like reference numerals designate identical or corresponding parts throughout the several views, the portable insect electrocutor trap of the present invention is illustrated generally at 10 in FIGS. 1 and 2.

The insect electrocutor 10 (FIGS. 1-8) includes generally an electrified grid assembly 12 secured to a liquid fuel lantern 14 by a grid bracket 16. A power supply 18 and converter 19 is housed in a base 20 and is electrically connected to the grid 12 by an interconnect device 22 and a guard 24 overlays the grid 12.

The lantern 14 of this invention includes a vented chimney 26 over a light producing burner 28 positioned on a frame bottom 30 over the lantern collar 32 over a fuel tank 34. A globe 36 surrounds the light producing burner 28 and seats onto the frame bottom 30. The chimney 26 is connected to the burner 28 by a stud 38 and nut 40. Vertical frame members 42 position around the light burner 28 and connect to the frame bottom 30.

Figure 3:
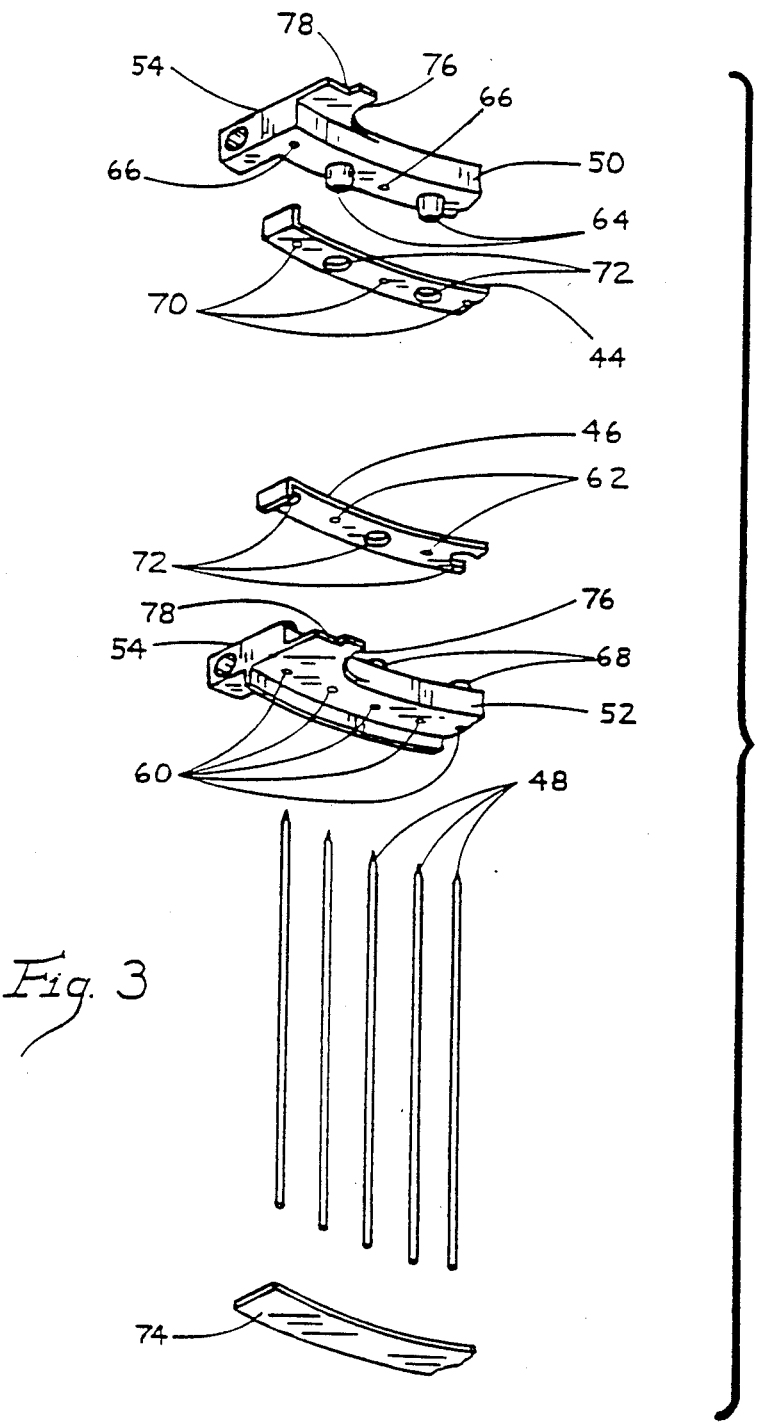
FIG. 3 is a partial exploded view illustrating the grid assembly of the present invention.
Figure 4:
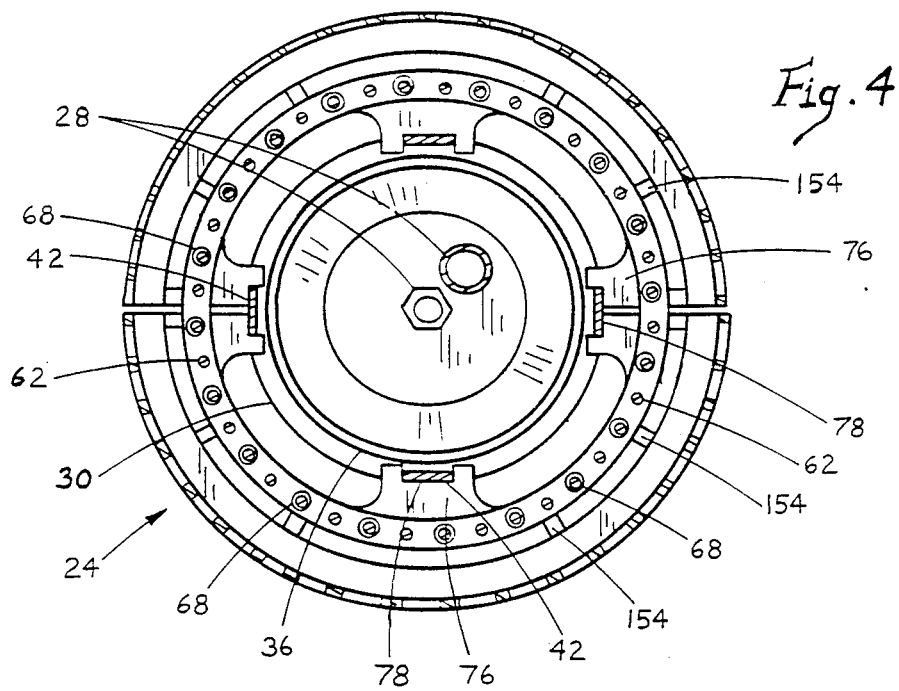
FIG. 4 is a cross-sectional view taken along line 4—4 of FIG. 2.
Figures 5A, 5B:
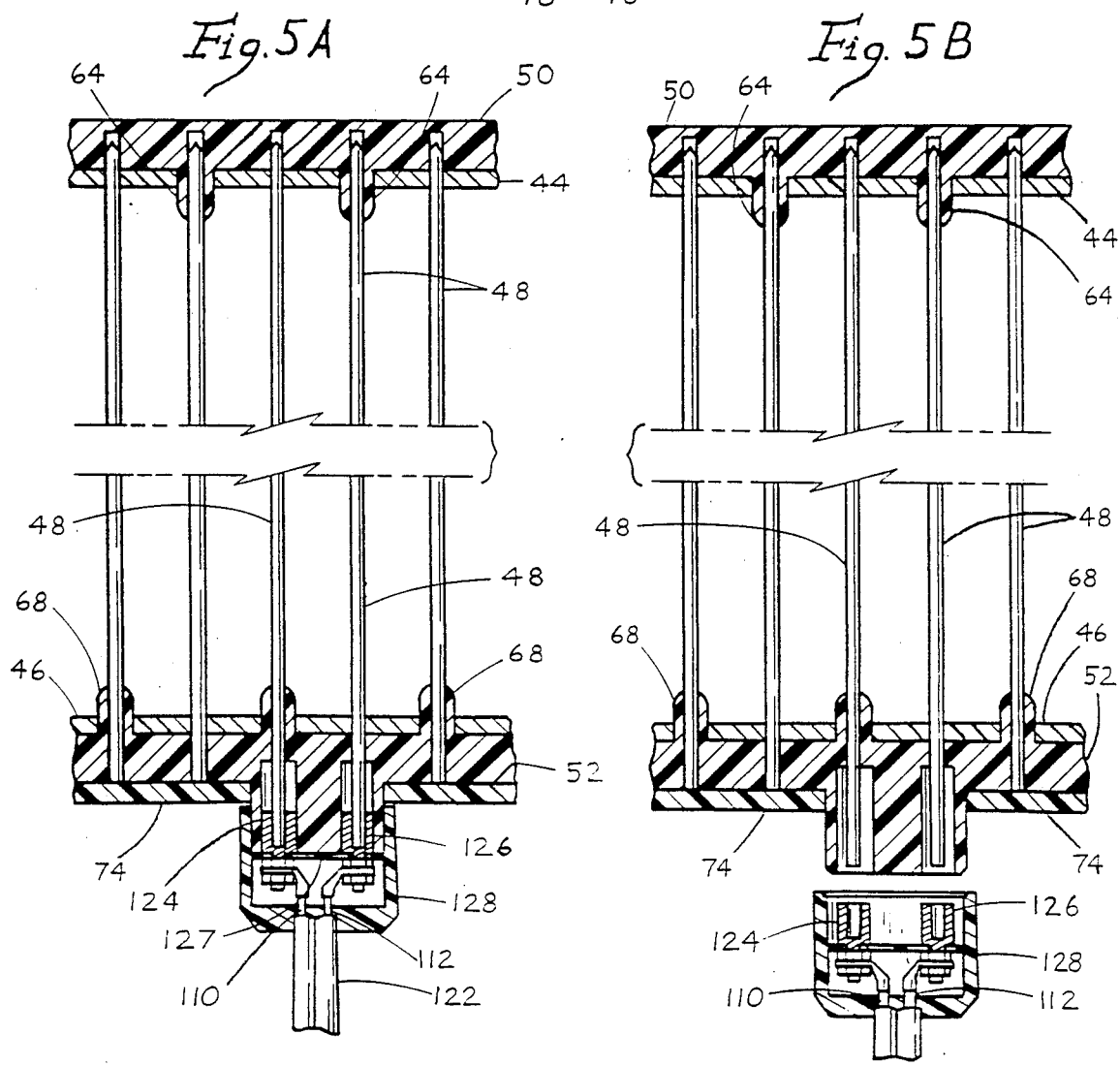
FIG. 5 is an enlarged cross-sectional view taken along line 5—5 of FIG. 2.
Figure 6:
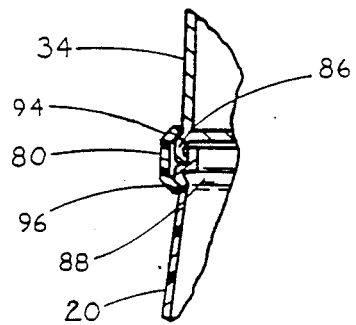
FIG. 6 is a cross-sectional view taken along line 6—6 of FIG. 2.

The grid 12 is circular in shape and constructed of electrically conductive material and includes a top ring 44 and a bottom ring 46 severed into two halves forming sections 44a and 46a spaced apart and defining generally the light emitting region of the lantern 14. Bars 48 make contact with the conductive rings 44 and 46 in an alternating pattern and are spaced generally parallel to each other. The bars 48 are electrically conductive from their specific ring 44 and 46, as seen in FIGS. 5a and 5b. The grid 12 is attached to a grid bracket 16 which includes a top grid bracket ring 50 and a bottom grid bracket ring 52 constructed of high temperature withstanding thermoplastic which is severed into two halves forming half sections 50a and 52a. The half sections 50a and 52a include mating edges 54 that include threaded orifices 56 which accept bolts 58 that function to join half sections 50a and 52a in a circular form. The top conducting ring 44 as seen in FIG. 3, seats to the underside of the top grid bracket ring 50 via bonding cement and the bottom conducting ring 46 seats on top of the bottom grid bracket ring 52 via bonding cement. Bars 48 connected to the bottom conducting ring 46 insert through orifices 60 in the bottom grid bracket ring 52 and extend up and insert through and make contact with orifices 62 in the bottom conducting ring 46 and insert through insulating tips 64 connected to the top grid bracket 50 and into orifices 66 in the top grid bracket ring 50. Bars connected to the top conducting ring 44 insert through orifices 60 in the bottom grid bracket ring 52 and insert through insulating tips 68 connected to the bottom grid bracket ring 52 and extend up and insert through and make contact with orifices 70 in the top conducting ring 44 and into orifices 66 in the top grid bracket 50. The top and bottom conducting rings 44 and 46 include orifices 72 which are large enough in diameter to allow the insulating tips 64 and 68 to extend above the surface of the conducting rings 44 and 46, thus allowing the conducting rings to lie flat against the cement and grid bracket rings 50 and 52. A cover piece 74 overlays the bars 48 after they have been inserted into the grid bracket rings 50 and 52 and conducting rings 44 and 46. After the bars 48 are positioned, solder, etc., may be applied at the point where the bars intersect with their specific conducting ring 44 or 46. The grid bracket rings 50 and 52 include horizontal members 76, as seen in FIGS. 1, 3 and 4, which function to attach the grid 12 in a fixed, spaced, electrically and thermally insulated relation to the lantern 14. The members 76 include recesses 78 which function to accept the lantern frame members 42. The grid bracket members 76 located on the bottom grid bracket ring 52 seat to the lantern frame bottom 30. The threaded nut 40, when tightened to the threaded stud 38, causes the chimney 26 to come into conducting with and apply force upon the top grid bracket ring 50, subsequently applying force upon the grid bracket ring members 76 seated to the lantern frame bottom 30, thus it is seen that the grid assembly 12 is rigidly attached to the lantern 14 by utilizing the compression created between the chimney 26 and the frame bottom 30. The complete grid assembly 12 may be removed from the lantern 14 by removing the electrical interconnect 22 and bolts 58. The grid bracket rings 50 and 52 and the conducting rings 44 and 46 need not be severed if they are being used in association with a lantern void of a frame assembly, including vertical supports. A grid bracket, such as the aforementioned, could be adaptable to all lanterns, including electric, that include a frame bottom functioning to seat a globe surrounding the light source.

The power supply 18 may be of many designs. For field operation typically a d.c. storage cell will be utilized for the power supply 18. However, the heat generated by the lantern could be utilized to create electricity which may be connected to the converter 19. Another option would be photovoltaic cells to utilize the light produced by the lantern to power the converter. A converter steps up the voltage from the power supply 18 to several thousand volts, typically between one and six thousand volts with a current of less than 10 milliamperes. The specific voltage and current being in part dependent upon the spacing of the bars 48 and the capacity of the converter 19.

The base 20 is secured to the lantern fuel tank 34 by a constricting band 80, a buckle connector 82 and hook 84, as seen in FIGS. 1 and 2. The base 20 provides support for the lantern 14 and houses the converter 19 and can also house the power supply 18. The lantern fuel tank 34 includes a protruding edge 86 and the base 20 includes a protruding edge 88. The band 80 is severed forming ends 90 and 92 and include bent edges 94 and 96. The bent edge 94 overlays the fuel tank edge 86 and the bent edge 96 overlays the base protruding edge 88. The buckle connector 82 is attached to the band end 90 by rivets 98 and the hook 84 is attached to the opposite band end 92 by rivets 98. The buckle connector 82 and hook 84 function to pull the band 80 securely against the lantern fuel tank protruding edge 86 and the base protruding edge 88, thus connecting the base 20 to the lantern fuel tank 34. The base 20 is smaller in diameter at the top closest to the fuel tank 34 than at the bottom which gives greater 6 stability to the invention. A gasket 102 recessed in a channel 100 positioned around and above the base protruding edge 88 functions to keep moisture out of the base 20 when the lantern fuel tank makes conducting with the gasket 102 after being attached to the base 20. Dividers 106 and 108 inside the base 20 create areas A, B, and C. The converter 19 mounts to divider 108 in the C area. Areas A and B may be used as storage areas and/or the d.c. power source may be placed in area A or B.

Figures 7A, 7B:
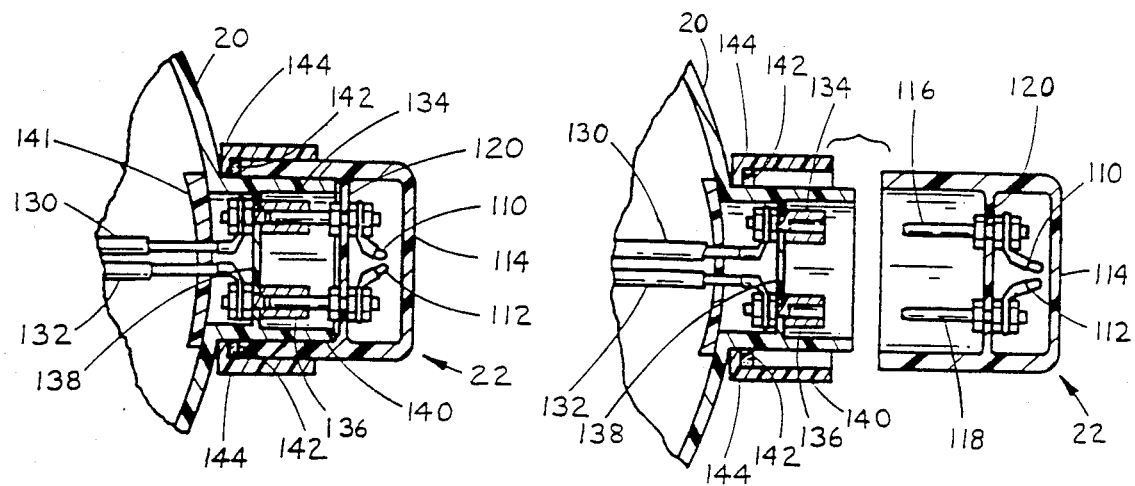
FIG. 7 is a cross-sectional view taken along 7—7 of FIG. 2 illustrating the electrical interconnect engaged and disengaged from the inverter.
Figure 8:
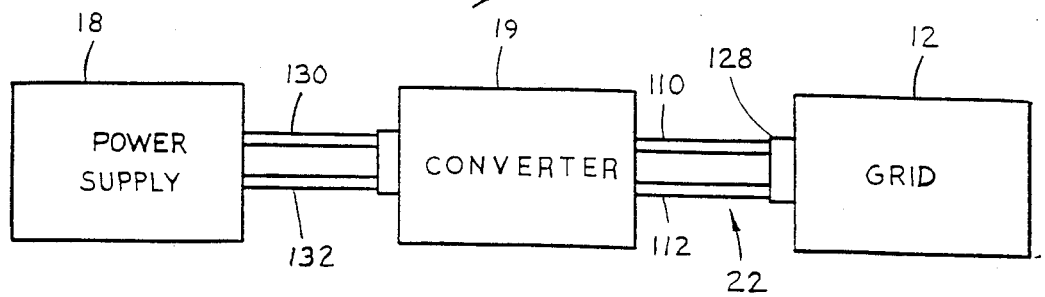
FIG. 8 is a block diagram illustrating the power supply equipment.

Extending between the power supply 18, the converter 19, housed in the base 20 and the grid 12, is the electrical interconnect 22, as seen in FIGS. 2, 5a, 5b, 7a, and 7b. The interconnect is removably connected to the converter 19 in the base 20 and includes a positive conductor 110 and a negative conductor 112 encapsulated in a solid portion 114. The conductors 110 and 112 are connected to conventional male conducting pins 116 and 118, preferably banana pins because of their rigidity, mounted to a divider 120 recessed in the lower end of the interconnect 22. The conductors 110 and 112 extend up and out of the solid portion 114 of the interconnect 22 forming a flexible portion 122 and connect to conventional female receptacles 124 and 126 mounted to a divider 127 in a plug 128, as seen in FIGS. 5a and 5b. The electricity generated by the power supply 18 and the converter 19 connect to the interconnect 22 via conductors 130 and 132, as seen in FIGS. 7a and 7b, connected to conventional female receptacles 134 and 136 mounted to a divider 138 in a housing 140 connected to the base 20. One of the conductors 130 is electrically connected to the interconnect male conducting pin 116 and the other conductor 132 is connected to the opposite male conducting pin 118, thereby transferring electricity from the converter 19 to the interconnect 22. The grid 12 is thus charged with a positive electric charge and a negative electric charge occurring on the rings 44/46 and the bars 48. A gasket 142 is recessed in a channel 144 connected to and surrounding the female receptacle housing 140 and functions to keep moisture out of the interconnect 22 and the housing 140 when the interconnect 22 is positioned in the housing 140 and comes into conducting with the gasket 142 in the channel 144.

A guard 24, as seen in FIGS. 1 and 2, extends around the outside area of the grid 12 to prevent people from accidentally coming into conducting with the grid 12 when it is electrically charged. The guard 24 includes a top ring 146 and a bottom ring 148 severed into two halves. The top half ring 146 is attached to the underside of the top grid bracket ring 50, preferably with a heat withstanding bonding agent, and the bottom half rings 148 are attached on top of the bottom grid bracket rings 50 with the aforementioned agent, thus allowing access to the bolts 58. Also included is a screen 150 which attaches to the top guard ring 146 and the bottom guard ring 148. The screen 150 is constructed preferably of thermoplastic and includes openings 152 which allow insects to freely pass through. Support members 154 attach to the bottom guard ring 148 and bottom grid bracket ring 52 and function to space the guard 24 from the grid 12 in a fixed position which allows the insects to fall to the ground or in the water if the user is using the invention to lure fish by the action of the insects falling into the water.

During operation of the insect electrocutor trap 10, the power supply 18 and converter 19 charge the grid 12 with a high voltage standing wave, alternately polarized on the individual bars 48 of the grid 12. When an insect passes near or comes into conducting with the bars 48, the electrical resistance on the bars 48 is reduced, thus killing or stunning the insect. The light emitted by the lantern 14 attracts the insects and they are eliminated by the action of the grid 12.

What is claimed is:

1. A portable electronic insect controller, comprising:

an electrified grid means being alternately polarized with voltage in association with a light producing lantern for electrocuting insects when they pass near or make conducting with the electrically charged grid;

a power supply means for supplying a controlled source of electrical energy to the grid;

a base for supporting the lantern and housing the power supply means;

said grid means further including a grid bracket, said bracket engaging the grid means to the lantern in a spaced and insulated relationship; and a safety interconnect means for electrically connecting the power supply means to the grid means and said safety interconnect means is only sufficient in length to extend directly between said power supply means and said grid means, thereby requiring that the grid means be disconnected from the power supply means prior to removing the grid means from the lantern to service the lantern in the region that the grid means surrounds.

2. A portable electronic insect controller as claimed in claim 1 further including a guard, said guard being spaced overlaying the grid means for preventing the accidental conducting with the grid means.

3. A portable electronic insect controller as claimed in claim 1 wherein the power supply means includes a direct current power source electrically connected to a converter for stepping up the voltage high enough to stun or kill insects when they pass near or make conducting with the electrically charged grid, said voltage passing to the safety interconnect means.

4. The structure of claim 1 wherein the grid bracket is further defined as including members which space the grid means from the lantern and engage the grid means to the lantern.

5. A portable electronic insect controller as claimed in claim 1 wherein said lantern includes a frame bottom functioning to seat a globe surrounding the light emitting region of said lantern and said grid bracket attaching to said lantern frame bottom.

6. The structure of claim 1 wherein the base is further defined as including a means to divide the inside of said base, thereby creating an area for the storage of a converter or the power supply or lantern spare parts.

7. The structure of claim 1 wherein the base is further defined as being smaller in diameter at its top than at its bottom, thereby providing stability to the invention.

8. A portable electronic insect controller, comprising:

an electrified grid means being alternately polarized with a high voltage in association with a light producing lantern to kill or stun insects when they pass near or make conducting with the electrically charged grid;

a housing means connected to the lantern for storage of a converter or a power supply means;

said grid means further including a grid bracket, said bracket engaging the grid means in a secure, fixed position and attaches the grid means to the lantern in a spaced and insulated relationship; and a power supply means for supplying a controlled source of electrical energy to the grid means.

9. A portable electronic insect controller as claimed in claim 8 further including a safety interconnect means for electrically connecting the power supply means to the grid means and said safety interconnect means is only sufficient in length to extend directly between said power supply means and said grid means, thereby requiring that the grid means must first be disconnected from the power supply means prior to removing the grid means to service the lantern in the area that the grid means surrounds.

10. A portable electronic insect controller as claimed in claim 8 wherein the power supply means includes a direct current power source electrically connected to a converter for stepping up the voltage high enough to stun or kill insects when they pass near or make conducting with the electrically charged grid.

11. A portable electronic insect controller as claimed in claim 8 wherein the grid means includes a bottom and top electrically conductive ring, said rings being substantially parallel to each other, spaced apart and including bars, said bars connected to the top ring or the bottom ring in a spaced arrangement and electrically isolated from each other and the lantern, said bars being charged with either a positive or negative charge.

12. A portable electronic insect controller as claimed in claim 8 wherein the structure of said housing is further defined as a base securely attached to the lantern and said base supporting said lantern.

13. A portable electronic insect controller as claimed in claim 12 wherein the base further includes a seal means to keep moisture out of said base when said base is attached to the lantern.

14. The structure of claim 13 wherein the base is smaller at its top than at its bottom, thereby providing stability to the invention.

15. A portable electronic insect controller as claimed in claim 8 wherein the said lantern further includes a light source protective means, said light source protective means being positioned between the grid means and the light source.

16. A portable electronic insect controller, comprising, an electrically conductive grid means being alternately polarized with electricity in association with a light producing lantern for electrocuting insects when they pass near the electrically charged grid means;

a power supply means for supplying a controlled source of electrical energy to the grid means;

said grid means further including a bracket, said bracket engaging the grid means to the lantern;

a housing means connected to the lantern for the storage of power supply equipment.

17. A portable electronic insect controller as claimed in claim 16 further including a safety interconnect means for electrically connecting the power supply equipment to the grid means and said safety interconnect means is only sufficient in length to extend between said power supply equipment and said grid means, thereby requiring that the power supply equipment must first be disconnected from the grid means prior to removing an otherwise electrically charged grid from the lantern.

18. A portable electronic insect controller as claimed in claim 16 further including a guard, said guard spaced overlaying the grid means for preventing the accidental contact with the grid means.

19. A portable electronic insect controller as claimed in claim 16 wherein the said lantern further includes a light source protective means, said light source protective means being positioned between the grid means and said light source.

20. A portable electronic insect controller as claimed in claim 16 wherein the housing means is further defined as including a base attached to the lantern below the grid means, said base supporting said lantern.

21. A portable electronic insect controller as claimed in claim 20 wherein the base is further defined as being less in diameter at its top than at its bottom, thereby becoming tapered.

22. A portable electronic insect controller as claimed in claim 16 wherein the power supply equipment further includes a converter electrically connected to a direct current power supply functioning to produce electrical energy to electrocute insects when said insects pass near the said grid means.

23. A portable electronic insect controller as claimed in claim 16 wherein said lantern is further defined as including a member functioning to support a light source protective means and said grid bracket attaching to said member.

* * * * *